United States Patent [19]

Allen

[11] Patent Number: 4,693,414
[45] Date of Patent: Sep. 15, 1987

[54] CONTAINER CLOSURE DEVICE

[76] Inventor: Louis Allen, 166 E. 61 St., New York, N.Y. 10021

[21] Appl. No.: 904,968

[22] Filed: Sep. 8, 1986

[51] Int. Cl.$^4$ .............................................. B65D 5/64
[52] U.S. Cl. ........................... 229/125.02; 229/125.06; 229/125.12; 229/125.19
[58] Field of Search ..................... 229/7 SC, 43, 19, 9, 229/11, 7 R; 220/323, 324, 326, 345, 351, 356, 352

[56] References Cited

U.S. PATENT DOCUMENTS

| | | | |
|---|---|---|---|
| 2,846,130 | 8/1958 | Foote | 229/7 SC |
| 3,110,436 | 11/1963 | Wagner | 229/7 SC |
| 3,180,552 | 4/1965 | Atkinson, Jr. | 229/7 R |
| 4,360,148 | 11/1982 | Forbes, Jr. | 229/43 |
| 4,387,512 | 6/1983 | Gorski et al. | 229/7 SC |

Primary Examiner—Willis Little
Attorney, Agent, or Firm—Natter & Natter

[57] ABSTRACT

A container closure device for a dispensing package container includes a shell having a pair of opposed face plates, a top plate, and a side panel in substantially orthogonal relationship. The face plates are resiliently urged toward each other for grippingly engaging the container. An elastomer material within the shell provides an air-tight seal with the container. Locking ridges within the face plates interact with a top wall and an end wall of the container for providing a snap-fitting engagement with the container. In an alternate embodiment, the face plates are independently displaceable with respect to the side panel for providing, gripping closure over a range of package widths. In another embodiment the shell is comprised of adjustably interfitting components for providing width adjustment.

21 Claims, 11 Drawing Figures

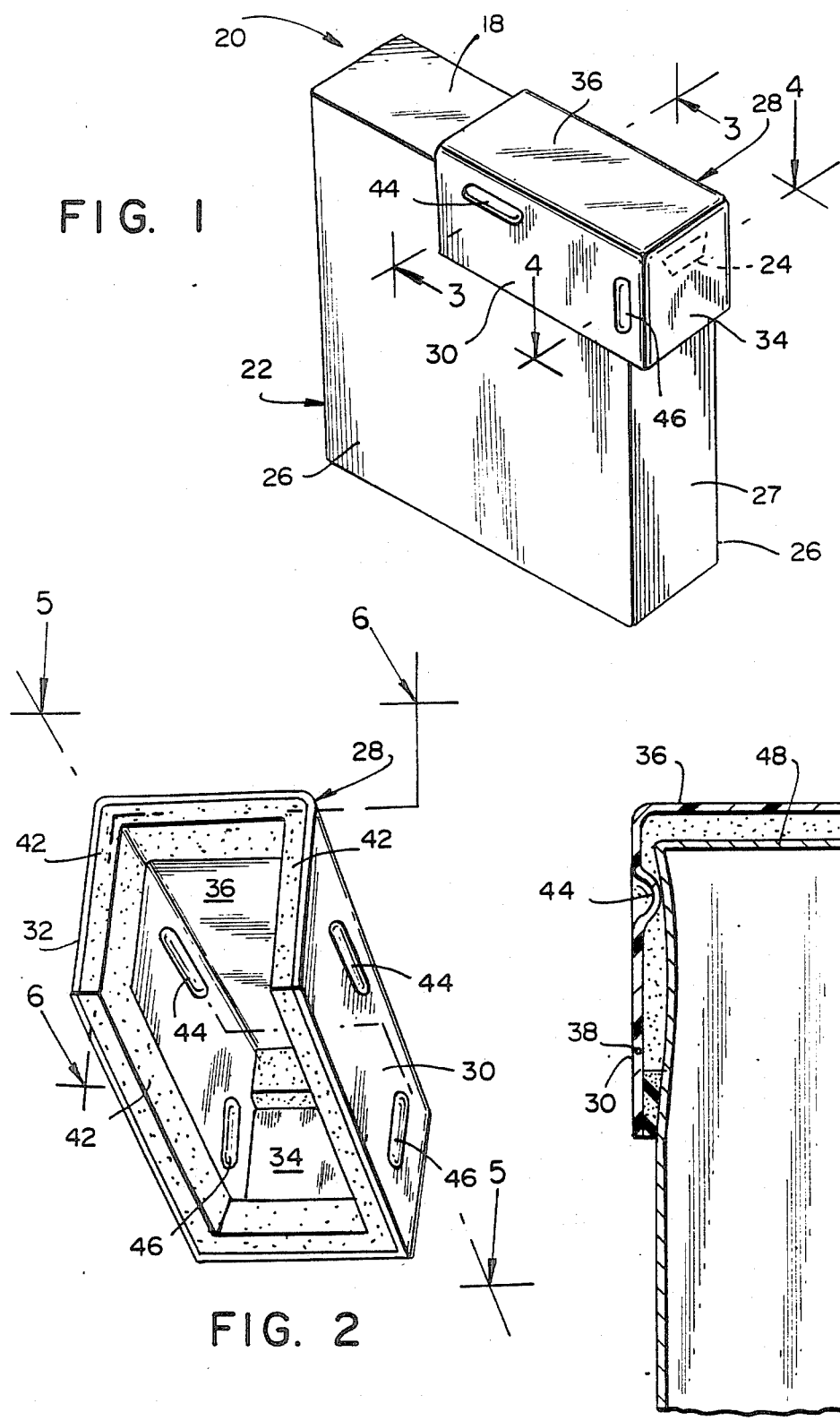

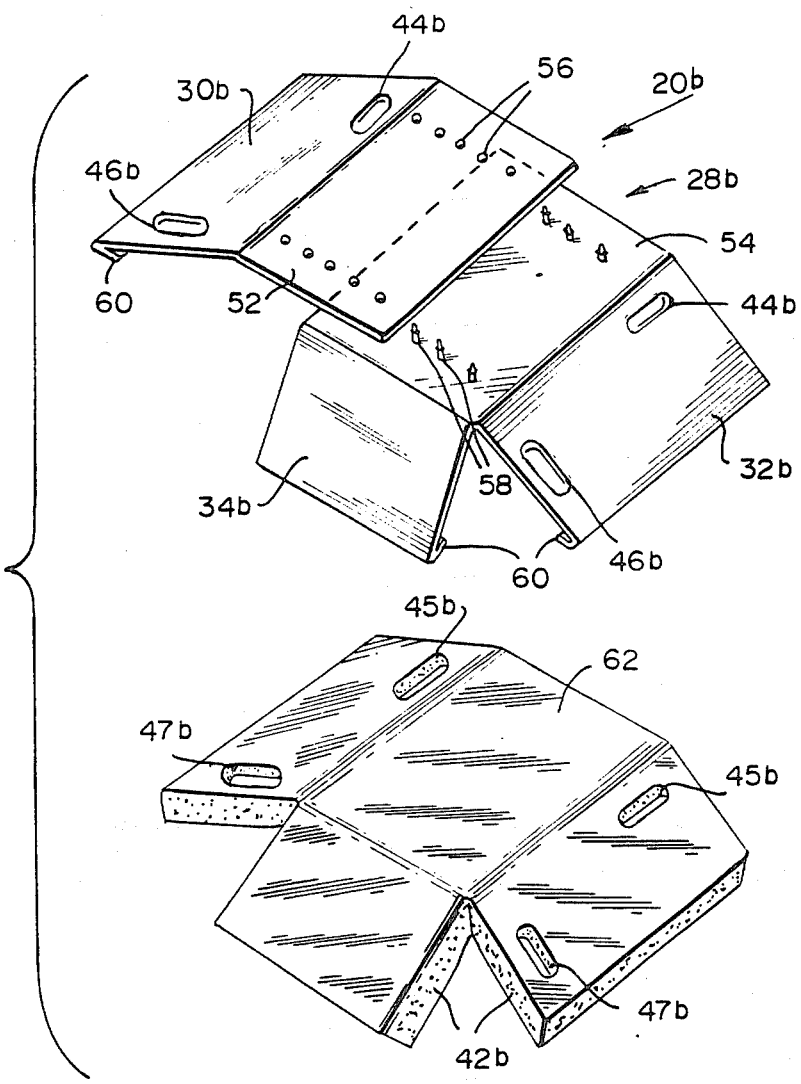
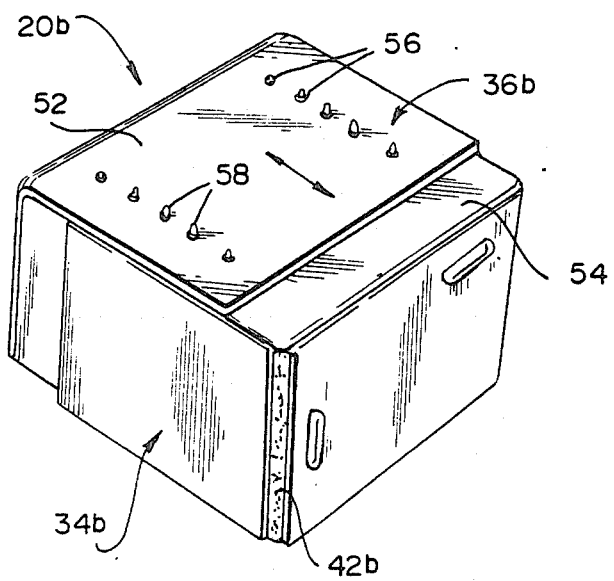

CONTAINER CLOSURE DEVICE

BACKGROUND OF THE INVENTION

1. Field of the Invention

This invention relates to cardboard boxes and especially to rectangular-shaped containers having a top or side opening for dispensing the contents thereof.

In particular, the container closure of this invention is adapted for sealing containing apertures or spouts.

2. Description of the Prior Art

Consumer products are frequently marketed in cardboard or paperboard boxes and usually have a rectilinear configuration. These containers are conveniently stackable on store shelves and are readily storable within the consumer's cupboard. Frequently, the containers are also provided with apertures or spouts for dispensing the contents directly therefrom.

These types of dispensing boxes are typically found in connection with food products such as cereals, rice, sugar, pasta, raisins, etc. They are also widely used for cleaning preparations such as powdered soap and detergents.

The box construction generally employs an access opening having interfitting closure flaps formed as an integral portion of the box top, a break-away lift tab at a corner of the box top, or a tab and slot arrangement along the upper surface of the box. Some containers have a pouring spout incorporated in a sidewall of the container adjacent the top. It should also be apparent that containers are available in various dimensions dependent in part, upon the nature of the contents and the net weight.

A problem encountered with the aforementioned dispensing containers was that they were inefficient for providing an airtight seal. This was a distinct disadvantage with food products, since they were subject to spoilage and thus the contents would become stale or rancid. Furthermore, improperly sealed food packages were susceptible to roach or insect infestation or other contamination. With regard to nonedible contents such as cleaning preparations, moisture could chemically react and adversely affect the contents, or there would be loss due to spillage.

An attempt to prolong the shelf life of open food containers included the use of refoldable innerbags. This device, however, was not particularly successful for the reason that the innerbags were frequently torn when initially opened or after repeated usage. Furthermore, this system required the careful refolding of the bag after each dispensing of the contents. Another method for preserving freshness of food contents was by the use of BHT* and other antioxidants in the packaging material; however, the use of these substances were objectionable to many consumers.

*Butylated Hydroxytoluene

Alternate solutions for providing an auxiliary container cover was shown in U.S. Pat. No. 4,249,693. The device of that patent, however, did not provide a structure for closely conforming to the walls of the container and thus did not provide an effective seal. Another disadvantage was that the cover did not have any positive securement to the container and thus could accidently become dislodged.

Another shortcoming of the previous box closures such as shown in U.S. Pat. Nos. 3,265,282, 3,695,504, and 3,733,022 was that those devices were not adaptable for use with a range of different container widths.

The device of the instant invention in contrast, is adjustably adapted for grippingly engaging different size containers to provide a tight seal.

SUMMARY OF THE INVENTION

Briefly, the nature of this invention concerns a closure device for resealing containers.

The closure device includes a shell adapted for placement over a corner of a container in overlapping relationship with the container aperture.

A feature of this invention is that the shell functions to grippingly engage the walls of the container. This is accomplished by incorporating a spring member within the shell. In an alternate embodiment, the shell is formed of a resilient plastic material having a memory. The invention also encompasses a shell made of a deformable material which can be forceably urged for sealing contact with the walls of the container. A variant form of the invention has also been disclosed including a shell member having adjustably attachable components such that the dimension of the shell can be varied in accordance with the width of the container.

Another advantage of the instant closure device is that the shell includes an elastomer liner which conforms to the contours of the container wall to provide a snug fit and more effective seal than in previous devices. The liner is further adapted for removable attachment to the shell for disposable replacement.

A further aspect of this invention is that the closure device incorporates locking ridges which provide snap-fit engagement with the container. The locking ridges interact with a top and side wall of the container and prevent the closure from being inadvertently dislodged from the container.

Having thus summarized the invention, it will be seen that it is an object thereof to provide a container closure device of general character described herein, which is not subject to the aforementioned disadvantages.

Specifically, it is an object of this invention to provide a container closure device for engaging a corner of a container in overlying relationship with a dispensing opening of the container.

A further object of this invention is to provide a container closure device which is adaptable for accommodating different width containers.

A still further object of this invention is to provide a container closure device utilizing a compressible material for effecting an air-tight seal with the container.

An additional object of the present invention is to provide a container closure device having a snap-fit securement to the container.

Still another object of this invention is to provide a container closure device of the general character described which is simple in construction, low in cost, reliable in use, and well adapted for mass production and fabrication techniques.

Other objects of the invention in part will be apparent and in part will be pointed out hereinafter.

With these ends in view, the invention finds embodiments in certain combinations of elements and arrangement of parts which the aforementioned objects and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown possible exemplary embodiments of the invention;

FIG. 1 is a perspective view of a container closure device of this invention showing a typical application of the device on a container;

FIG. 2 is an enlarged perspective view of the container closure device showing in detail a shell having a plurality of locking ridges and an elastomer lining;

FIG. 3 is a sectional view taken substantially along line 3—3 of FIG. 1 illustrating the interaction of the locking ridges and the elastomer lining with a side wall of the container;

FIG. 10 is an exploded view in perspective illustrating another embodiment of the closure device having adjustably attachable shell components, and an elastomer lining, and FIG. 11 illustrates the assembled closure device of FIG. 10.

DESCRIPTION OF THE PREFERRED EMBODIMENTS

Figure 4:
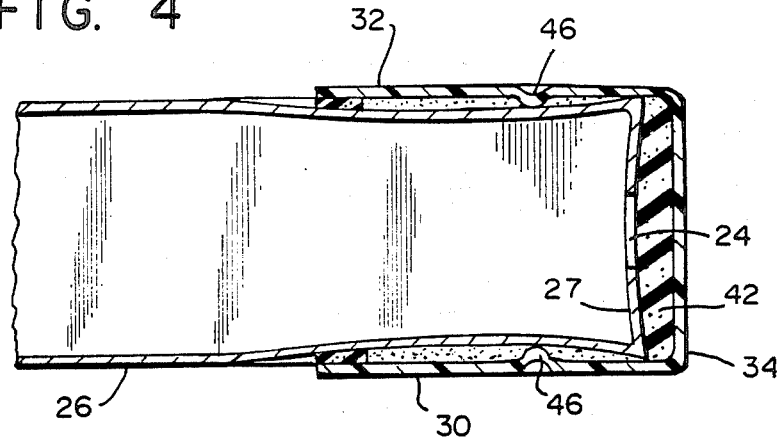
FIG. 4 is a partial sectional view taken substantially along line 4—4 of FIG. 1 demonstrating the interaction of another of the locking ridges and the elastomer lining with the side walls of the container.

Referring now in detail to the drawing, the reference numeral 20 denotes generally a container closure device of this invention. The closure device 20 is illustrated in FIG. 1 in combination with a package container 22. The container 22 has a pair of side walls 26 and an end wall 27. For the purposes of this description, a spout 24 is shown incorporated in the end wall 27.

The closure device 20, includes a shell 28, fabricated of a sheet material e.g. plastic, metal, cardboard, or other flexible materials.

The shell 28 is constructed with a pair of face plates 30,32, a side panel 34, and a top panel 36 in substantially orthogonal relationship.

Figure 5:
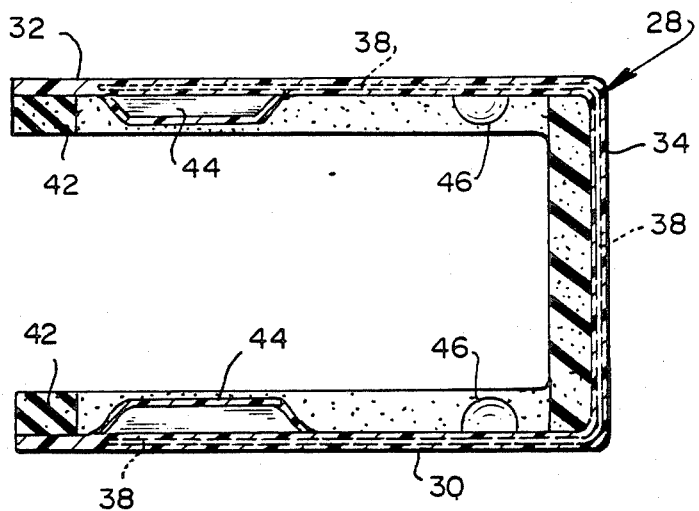
FIG. 5 is a sectional view taken substantially along line 5—5 of FIG. 2 showing a longitudinal spring member incorporated within the shell and further showing an arrangement of locking ridges and an elastomer lining.
Figure 6:
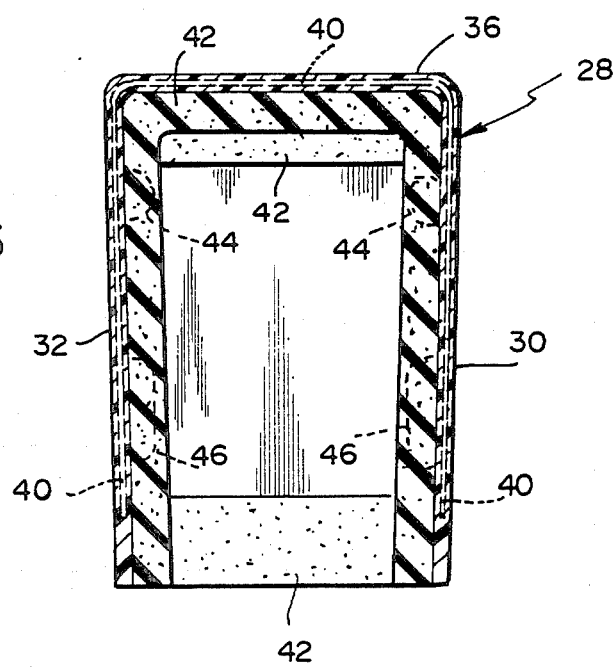
FIG. 6 is a sectional view taken substantially along line 6—6 of FIG. 2 showing a transverse spring member, and the arrangement of the locking ridges and the elastomer lining.

In order to provide the shell 28 with gripping or clamping capabilities, a plurality of longitudinal spring members 38 are incorporated within the face plates 30,32 and the side wall 34, as typically shown in FIG. 5. In addition, a plurality of transverse spring members 40 are incorporated within the face plates 30, 32, and the top panel 36 as typically shown in FIG. 6. The combination of spring members 38,40, resiliently urge the shell 28 for gripping engagement of the package container 22. Alternatively, a clamping action can be achieved through the selection of a sheet material for the shell 28, having inherent resilient properties.

The shell 28 is further provided with an elastomer lining 42, such as foam rubber or like compressible material which will conform to the surface contours of the container 22. The elastomer lining 42 can be coextensive with the shell 28 or as shown in FIG. 2, positioned around the periphery of the shell for providing an air-tight seal. In this connection, it should be further noted that a section of the elastomer lining 42 is placed on the side panel 34 in confronting relationship with the spout 24 to further insure adequate sealing. The elastomer lining 42 may be releasably attached to the shell 28 for replacement when worn or soiled.

Another aspect of the closure device 20 is that the face plates 30,32 are respectively formed with a longitudinal locking ridge 44 and a transverse locking ridge 46. The locking ridges 44,46 can preferably be incorporated in the shell 28 during the manufacture thereof and comprises recessed areas projecting inwardly. Alternately, the interior surface of the shell 28 can be provided with corresponding raised sections. The purpose of the locking ridges 44,46 is to provide a positive, snap-fit engagement of the closure device 20 with the container 22. It has been found that the side walls 26 and the end wall 27 of the container 22 tend to flex inwardly in response to the pressure of the closure device 20. A top wall 48 of the container 22 is generally reinforced and will substantially resist deformation.

Referring now to FIG. 3, it should be noted that the longitudinal locking ridges 44 snap into place after passing over the edges of the top wall 48 as the closure device 20 is seated upon the container 22. Concurrently, the transverse locking ridges 46 lock into place as they pass over the edges of end wall 27. It should also be noted that the elastomer lining 42 will abut against the spout 24.

Figure 7:
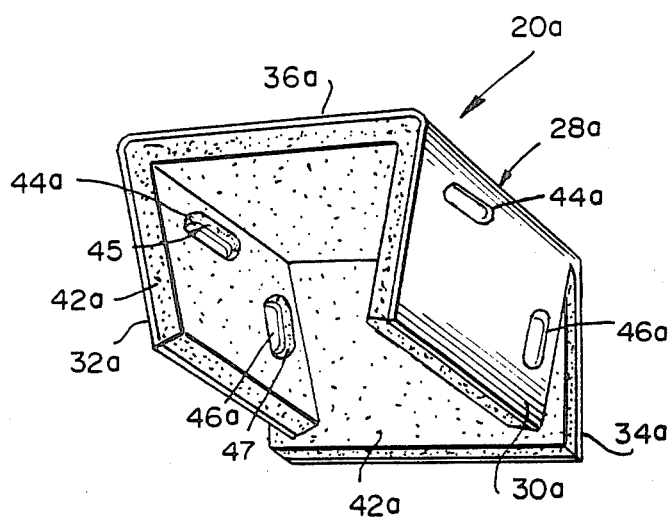
FIG. 7 is a perspective view showing an alternate embodiment of the closure device having a shell with two face plates in an inwardly urged gripping position, a side panel, and a top panel positioned orthogonally with respect to each other.
Figure 8:
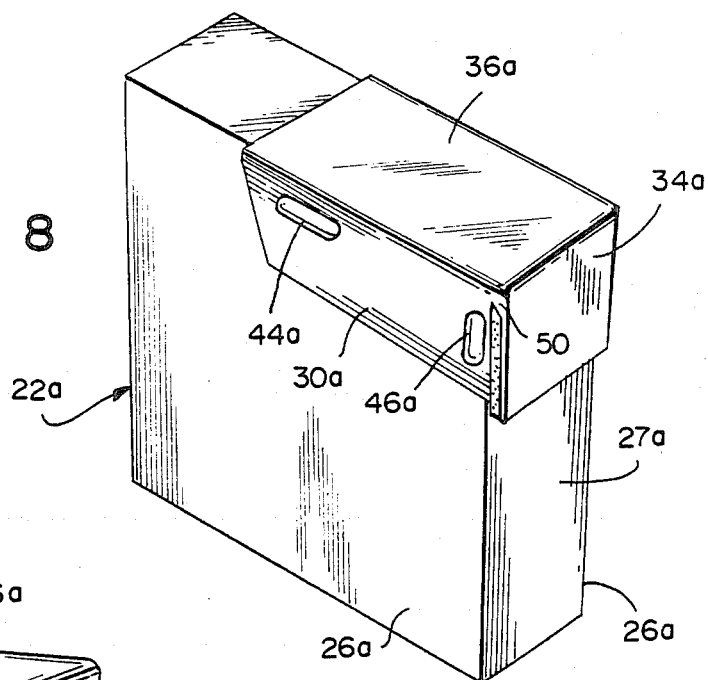
FIG. 8 is a perspective view showing the closure member of FIG. 7 in engagement with a container.
Figure 9:
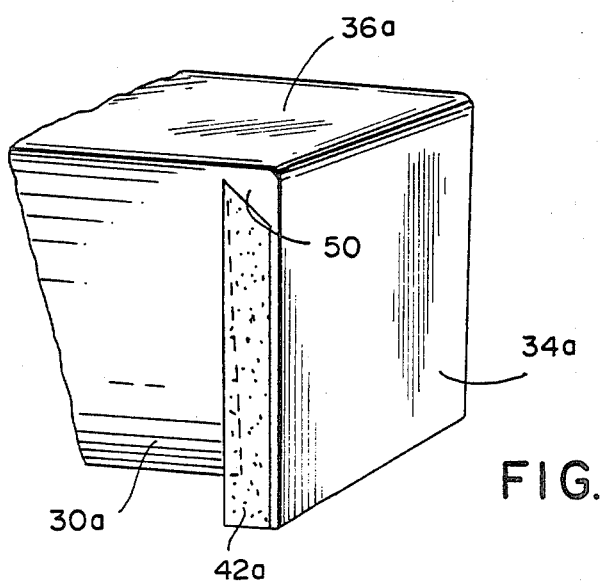
FIG. 9 is an enlarged perspective view detailing a bracket between the side panel and top panel.

In a modified embodiment shown in FIGS. 7-9 wherein like numerals of the previous embodiments have been utilized for representing corresponding parts with the suffix "a", a closure device 20a includes a shell 28a having face plates 30a, 32a and a side panel 34a. The shell 28a is provided with an elastomer lining 42a as described in the previous embodiment except that it is coextensive with the shell 28a. In addition, a pair of longitudinal locking ridges 44a and a pair of transverse ridges 46a have been incorporated in the respective face plates 30a, 32a. The lining 42a is provided with an opening 45 and an opening 47 through which the respective locking ridges 44a and 46a project.

It should be noted, however, that the side panel 34a is not connected to either face plate 30a, 32a and is joined solely to a top panel 36a. Furthermore, a bracket portion 50 has been incorporated for reinforcing the interconnection between the side panel 34a and the top panel 36a.

The purpose of disjoining the face plates 30a, 32a and side panel 34a is to provide for maximum adjustable movement of the face plates 30a, 32a for compatibility with different size containers and with deformable container walls. It should be further observed that this modified embodiment does not include longitudinal spring members although the previously described transverse spring members 40 can be employed. This modified embodiment can preferably be fabricated from a deformable material such as sheet metal so that the face plates 30a,32a can be displaced upon the application of pressure for clamping engagement with the side walls 26a of a container 22a.

It should be noted that the elastomer lining 42a on the side panel 34a will be in contiguous frictional contact with the confronting edges of the face plates 30a, 32a and/or the respective elastomer linings 42a during displacement.

Another variant form of the invention is shown in FIGS. 10 and 11 wherein like numerals have been used to represent similar elements of the previous embodiments with the addition of the suffix "b".

A shell member 28b is comprised of two interfitting components, a female clamp 52 and a male clamp 54. The female clamp 52 is provided with a plurality of perforations 56 and the male clamp 54 includes a plurality of pins 58 adapted for registration with the perforations 56 at selected locations to provide adjustability in the width dimension. The pins 58 include a bulbous portion for snap-fit into the perforations 56 as is well known in the art. The female and male clamps 52,54 include respective face plates 30b, 32b, a side panel 34b on the male clamp 54 and a top panel 36b. In addition, it should be noted that a pair of face plates 30b, 32b include a set of locking ridges 44b, 46b.

An elastomer lining 42b is adapted for placement within the shell 28b as assembled and for that purpose the face plates 30b, 32b, and the side panel 34b are each provided with an inwardly up-turned lip 60 for positioning the elastomer lining 42b. In addition, the lining 42b has a support backing 62 coextensive with the lining 42b for providing rigidity to the elastomer material. The backing 62 can be engaged within the lip 60 to support the lining 42b within the shell 28b. Alternate arrangements such as by using an adhesive on the backing 62 can also be used. The lining 42b and the backing 62 include an opening 45b and an opening 47b through which the respective locking ridges 44b and 46b can project.

The assembled closure device 20b is noted in FIG. 11. The materials used can be similar to those of the previously described embodiments and can include deformable materials or resilient materials having a "memory".

Thus, it will be seen that there is provided a container closure device which achieves the various objects of the invention and which is well adapted to meet conditions of practical use.

Since various possible embodiments may be made of the present invention and various changes might be made in the exemplary embodiments set forth, it is to be understood that all materials set forth or shown and described in the accompanying drawings are to be interpreted as illustrative and not in a limiting sense.

Having thus described the invention, there is claimed as new and desired to be secured by Letters Patent:

1. A container closure device for a package container having a dispensing aperture comprising a shell including a pair of face plates, a side panel, and a top panel, means for urging at least the face plates toward each other, a compressible lining within the shell conforming to the container for providing a tight seal, and locking means interacting with the container walls for providing snap-fitting engagement with the container.

2. A container closure device as claimed in claim 1 wherein the means for urging the face plates toward each other include a longitudinal spring member incorporated in the face plates and the side panel.

3. A container closure device as claimed in claim 2 wherein the means for urging the face plates toward each other further include a transverse spring member incorporated in the face plates and the top panel.

4. A container closure device as claimed in claim 1 wherein the compressible lining is comprised of an elastomer material.

5. A container closure device as claimed in claim 1 wherein the locking means include ridges in the face plates which project inwardly.

6. A container closure device as claimed in claim 5 wherein the locking means include longitudinal locking ridges for interacting with a top wall of the container.

7. A container closure device as claimed in claim 5 wherein the locking means include transverse locking ridges for interacting with an end wall of the container.

8. A container closure device as claimed in claim 1, wherein the face plates are independent of the side panel.

9. A container closure device as claimed in claim 1, wherein the shell includes adjustably interconnectable components.

10. A container closure device as claimed in claim 9, wherein one of said components is provided with a plurality of perforations and the other of said components is provided with a plurality of pins, said pins being adapted for selective registration with the perforations for achieving shell width adjustment.

11. A container closure device as claimed in claim 4, wherein the elastomer material is placed within the sheel for registration with a dispensing spout of the container.

12. A container closure device as claimed in claim 1 wherein the means for urging the face plates toward each other includes a deformable sheet metal material.

13. A container closure device as claimed in claim 1, wherein the lining is provided with a support backing.

14. A container closure device as claimed in claim 5, wherein the face plates, the side panel and the top panel are in substantially orthogonal relationship.

15. A container closure device as claimed in claim 1, wherein the lining is removably attachable to the shell for selective replacement.

16. A closure device for a container comprising a pair of face plates, a top panel extending between and connecting the face plates, a side panel attached to the top panel and positioned substantially orthogonally with respect to the face plates, said face plates, said top panel and said side panel having compressible lining means, means for displacing at least one of said face plates either toward or away from the other of said face plates independently of said side panel, said lining means being in contiguous contact between the respective face plates and the side panel for sealing interaction, said lining means further providing sealing engagement with the container.

17. A closure device as claimed in claim 16 wherein the face plates are fabricated of a deformable metal material.

18. A closure device as claimed in claim 16 wherein the face plates are fabricated of a resilient material.

19. A closure device as claimed in claim 16 wherein the compressible lining means is fabricated of an elastomer material.

20. A closure device as claimed in claim 16 wherein the lining means is releasably attachable for selective replacement.

21. A closure device as claimed in claim 16 wherein the pair of face plates are displaceable either toward or away from each other for adjustable clamping engagement with said container.

* * * * *